United States Patent
Durand et al.

(10) Patent No.: US 9,602,342 B2
(45) Date of Patent: Mar. 21, 2017

(54) METHOD OF PROVISIONING NETWORK ELEMENTS

(71) Applicant: Comcast Cable Communications, LLC, Philadelphia, PA (US)

(72) Inventors: Alain D. Durand, West Chester, PA (US); Srinivas Avirneni, Chester Springs, PA (US); John J. Brzozowski, Schwenksville, PA (US); Paul Eugene Schauer, Highlands Ranch, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 309 days.

(21) Appl. No.: 14/072,183

(22) Filed: Nov. 5, 2013

(65) Prior Publication Data
US 2014/0222981 A1    Aug. 7, 2014

Related U.S. Application Data

(63) Continuation of application No. 11/743,868, filed on May 3, 2007, now Pat. No. 8,612,556.

(60) Provisional application No. 60/797,135, filed on May 3, 2006.

(51) Int. Cl.
| | |
|---|---|
| *H04L 12/24* | (2006.01) |
| *H04L 29/12* | (2006.01) |
| *H04L 29/08* | (2006.01) |

(52) U.S. Cl.
CPC .... *H04L 41/0806* (2013.01); *H04L 29/12066* (2013.01); *H04L 29/12311* (2013.01); *H04L 61/1511* (2013.01); *H04L 61/1582* (2013.01); *H04L 61/2015* (2013.01); *H04L 61/2084* (2013.01); *H04L 67/125* (2013.01)

(58) Field of Classification Search
CPC .. H04L 41/0806; H04L 41/0803; H04L 41/08
See application file for complete search history.

(56) References Cited

U.S. PATENT DOCUMENTS

| | | | |
|---|---|---|---|
| 2001/0049717 A1 | 12/2001 | Freeman et al. | |
| 2002/0019866 A1* | 2/2002 | Linzy | H04L 41/0213 709/223 |
| 2002/0049803 A1 | 4/2002 | Bandhole et al. | |
| 2002/0107029 A1* | 8/2002 | Caughran | H04W 4/02 455/456.1 |
| 2002/0184376 A1 | 12/2002 | Sternagle | |
| 2003/0018758 A1* | 1/2003 | Fan | H04L 29/06 709/221 |
| 2003/0032404 A1* | 2/2003 | Wager | H04L 41/12 455/406 |
| 2003/0061509 A1* | 3/2003 | Fisher | G06F 21/31 726/5 |
| 2003/0063623 A1* | 4/2003 | Leslie | H04L 29/06027 370/466 |
| 2003/0069946 A1* | 4/2003 | Nair | H04L 29/06 709/220 |

(Continued)

*Primary Examiner* — Jenee Williams
(74) *Attorney, Agent, or Firm* — Banner & Witcoff, Ltd.

(57) ABSTRACT

A system and method for provisioning network elements, such as but not limited to the type of network elements used in cable television system to facilitate subscriber access to services. The provisioning may be accomplished without communications between multiple provisioning servers. This allows the provisioning to be conducted in a stateless manner.

20 Claims, 3 Drawing Sheets

(56) References Cited

U.S. PATENT DOCUMENTS

| | | | |
|---|---|---|---|
| 2003/0069948 A1* | 4/2003 | Ma | H04L 29/06 709/220 |
| 2003/0069974 A1* | 4/2003 | Lu | G06F 9/505 709/226 |
| 2003/0097422 A1* | 5/2003 | Richards | G06F 8/61 709/217 |
| 2003/0208602 A1 | 11/2003 | Bhalla et al. | |
| 2004/0054923 A1* | 3/2004 | Seago | H04L 63/102 726/4 |
| 2004/0059821 A1 | 3/2004 | Tang et al. | |
| 2004/0141472 A1* | 7/2004 | Haddad | H04M 15/8033 370/310 |
| 2005/0005026 A1 | 1/2005 | Brown et al. | |
| 2005/0027868 A1* | 2/2005 | Dodson | H04L 69/161 709/227 |
| 2005/0031108 A1* | 2/2005 | Eshun | H04L 29/06 379/201.12 |
| 2005/0055696 A1 | 3/2005 | Betzler et al. | |
| 2005/0149924 A1* | 7/2005 | Komarla | G06F 9/4416 717/176 |
| 2005/0198629 A1* | 9/2005 | Vishwanath | G06F 8/61 717/174 |
| 2006/0015617 A1* | 1/2006 | Castro | H04L 41/022 709/226 |
| 2006/0058028 A1* | 3/2006 | Allison | H04M 15/90 455/435.1 |
| 2006/0080742 A1* | 4/2006 | Nakayama | G06F 21/10 726/27 |
| 2006/0168196 A1* | 7/2006 | Herbert | G06F 9/4416 709/224 |
| 2006/0182282 A1* | 8/2006 | Negahdar | H04L 9/0825 380/277 |
| 2006/0187950 A1 | 8/2006 | Bou-Diab et al. | |
| 2006/0230165 A1* | 10/2006 | Zimmer | G06F 8/65 709/230 |
| 2007/0061458 A1* | 3/2007 | Lum | H04L 61/2015 709/225 |
| 2007/0118654 A1* | 5/2007 | Jamkhedkar | G06F 8/60 709/226 |
| 2007/0140262 A1 | 6/2007 | Wang | |
| 2007/0276900 A1* | 11/2007 | Wang | G06Q 10/06 709/203 |
| 2008/0084877 A1* | 4/2008 | Brzozowski | H04L 12/2801 370/389 |
| 2008/0201720 A1* | 8/2008 | Betzler | G06F 9/5088 718/105 |
| 2008/0282339 A1* | 11/2008 | Nakae | H04L 63/0227 726/13 |
| 2010/0049838 A1 | 2/2010 | DeHaan | |
| 2011/0055411 A1 | 3/2011 | Taaghol | |

* cited by examiner

METHOD OF PROVISIONING NETWORK ELEMENTS

CROSS-REFERENCE TO RELATED APPLICATIONS

This application is a continuation of U.S. application Ser. No. 11/743,868, filed May 3, 2007, which is a non-provisional of U.S. provisional application Ser. No. 60/797,135, filed May 3, 2006, the disclosures of which are hereby incorporated in their entirety.

BACKGROUND OF THE INVENTION

1. Field of the Invention

The present invention relates to methods and systems of provisioning network elements.

2. Background Art

The provisioning of network elements generally corresponds with a process in which network elements, such as but not limited to those having capabilities to communicate, receive, and/or otherwise exchange electronic information over networks are assigned a network address and instructed to operate according to any number of parameters specified within a set of provisioning instructions. The network address provides a designation to facilitate network communications and the provisioning instructions define any number of operating characteristics and parameters associated with the element's interaction with the network and other operations it may perform.

Global provisioning of network attached devices is usually a very complex process. IP addresses are usually either configured manually or assigned by a local DHCP server. Global monolithic systems to provision a large number of devices can be very complex and usually do not offer the desired level of reliability. They are often based on proprietary interfaces that makes them difficult to evolve and integrate with third party applications.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED ED DESCRIPTION OF THE PREFERRED EMBODIMENT(S)

Figure 1:
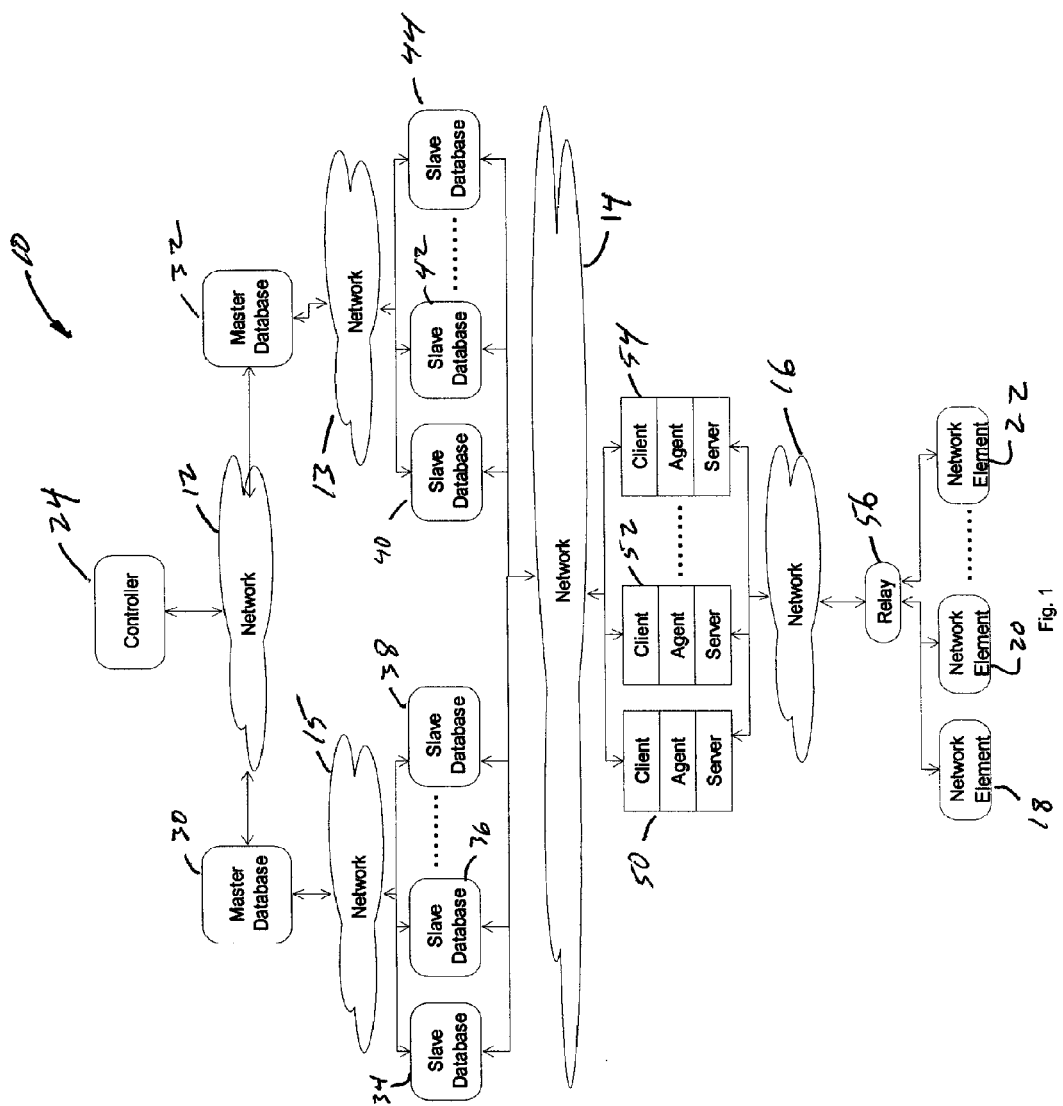
FIG. 1 illustrates a provisioning system in accordance with one non-limiting aspect of the present invention.

FIG. 1 illustrates a provisioning system 10 in accordance with one non-limiting aspect of the present invention. The provisioning system 10 includes one or more electronic data communication networks 12-16 for communicating electronic signals between any number of network elements 18-22. The provisioning system 10 may be associated with a service provider, enterprise network, or other entity, hereinafter commonly referred to as a controller 24, and configured to support provisioning of one or more network elements 18-22 through signaling over one or more networks 12-16.

The controller 24 may relate to any entity associated with supporting servicing or other operations of the network elements 18-22. The present invention contemplates the controller 24 being a media service provider having capabilities to support media, services on the network elements 18-22, an internet service provider having capabilities to support high-speed data and similar service on the network elements 18-22, a telecommunications service provider associated with telecommunication services, a local or wide area network provider associated with servicing a public or private network, and/or any other service provider configured to support or otherwise facilitate operations on the network elements 18-22. As such, the present invention is not intended to be limited to any particular controller or controllers associated with network based operations. Optionally, the controller 24 may be an enterprise, a local IT support structure, or other non-service related entity that may or may not provide services according to a customer-subscriber relationship.

The controller 24, for exemplary purposes and without intending to limit the scope and contemplation of the present invention; is most prominently described with respect to being a cable television service provider having capabilities for providing, for example, cable television, telecommunications, and high-speed data services that may be configured to support and/or facilitate the use of any number of television and non-television services and applications, such as but not limited to linear and non-linear television programming, (cable, satellite, broadcast, etc.), Video on Demand (VOD), interactive television (iTV), interactive gaming, pay-per-view (PPV), digital video recording (local and remote), and others.

The networks 12-16 may include any number of elements and devices to facilitate signal communications between the network elements and with other components in the system and the services associated with the controller 24. The networks 12-16 may include terrestrial and extraterrestrial components and infrastructures, such as but not limited to cable lines, telephone lines, and/or satellite or other wireless architectures and private and/or public networks, such as but not limited to the Internet and provider specific private networks.

The networks 12-14 may include and/or be associated with any number of the network support elements (not shown), such as but not limited to a headend, router, hub, switch, gateway, conditional access router (CARs), home gateways, cable modem terminations system (CMTSs), session boarder controller, media gateway, media gateway controller, signaling gateway, call management server, presence server, SIP routing proxy, SIP proxy/registrar server, PCMM policy server, bandwidth on demand server, streaming server caching proxy, gaming server, CDN, Media acquisition server, provider server, a unified messaging server, OSS/BSS, global directory server, digital or personal video recorder (DVRs, PVRs), media terminal adapter (MTA), and/or outlet digital adapter (ODA). Of course, the present invention is not intended to be limited to the foregoing and fully contemplates the use and/or association with arty number of other elements.

The network elements 18-22 may be located at subscriber locations or other locations associated with a geographical area supported by the controller 24. Each location may include one or more network elements 18-22 and the capabilities of the same may be based on subscriptions and other parameters set by the service provider. The subscriptions may specify various classes of services and other parameters associated with usage rights and services available to the corresponding subscriber or entity associated with the controller 24, including parameters associated with provisioning the network elements 18-22 of the subscriber.

The network elements 18-22 may relate to any number of devices or entities suitable for interfacing and/or facilitating interfacing with subscribers or other network elements, such as computers, processors, and the like. For example, one or more of the network elements may be a settop box (STB), digital video recorder (DVR), personal computer (PC), television (which may include embedded user interface and processing capabilities), outlet digital adapter (ODA), media terminal adapter (MTA), cable modem (CM), personal digital assistant (PDA), computer, mobile device (phone, computer, etc.), and any other item having capabilities to support access to any number of services, and other elements not associated with so called services, such as but not limited to back office servers and other network related elements, like those described above with respect to supporting network related operations.

The network elements 18-22 may be configured to descramble and support and/or facilitate the use of any number of television and non-television related signals, such as but not limited to Hyper Text Transfer Protocol (HTTP), Dynamic Host Configuration Protocol (DHCP), Syslog, Simple Network Management Protocol (SNMP), Trivial File Transfer Protocol (TFTP), Data Over Cable Service Interface Specification (DOCSIS), Domain Name Server (DNS) applications, DOCSIS Settop Gateway (DSG), out-of-band (OOB) messaging, and others.

As noted above, the network elements 18-22 may relate to any number of elements, devices, or other enterprises having capabilities to support network communications and/or other network related operations. For example, the network elements 18-22 may relate to customer premises devices/equipment and/or intermediary elements associated with supporting services interfaced with the customer related elements. Accordingly, the present invention contemplates any number configurations and capabilities for the network elements 18-22 and is not intended to be limited to any particular arrangement of the same or to those specified above.

The system 10, at least with respect to one exemplary non-limiting embodiment where the controller is a cable television service provider, may be used to provide media content to one or more of the network elements 18-22. The media content may relate to live and/or on-demand viewing/streaming/broadcasting of television programs, movies, audio, and other multimedia, as well as, downloading of clips or full-length versions of the same. The source of this content may be the service provider (which in turn may receive the content from other sources) and/or one or more of the subscriber network elements or other non--subscriber elements in the system 10.

For example, if the controller 24 is associated with a television service provider, a portion of the media content may relate to television programs, movies, and other multimedia that may be delivered from the media service provider, or one of the other elements in the system, to the network elements through streaming, downloading, broadcast, peer-to-peer, and any number of other processes. As is common with larger media content providers, multiple regional enterprises, such as but not limited to headend units and the like, may be configured to provide regional programming to a number of subscribers associated with the network elements. Each of the headends may store various types of media content for distribution to the subscribers it services.

In addition to providing and supporting the various services described above, the system 10 may be optionally configured to facilitate provisioning of the network elements 18-22. The provisioning may generally relate to facilitating interactions of the network elements 18-22 with other elements in the system or otherwise configuring the same. For example, the provisioning may generally relate to providing a set of provisioning instructions to the network elements 18-22 that are sufficient to instruct and/or program or otherwise facilitate programming of the same.

The provisioning instructions may specify any number of operating conditions and parameters for the network elements 18-22. Optionally, the provisioning instructions may specify unique network addresses that are to be used for interacting or otherwise communicating with the network elements over one or more of the networks. The network addresses may relate to any address or identifier suitable to facilitating network communications with the network elements, such as but not limited to Internet Protocol (IP) addresses (IPv4, IPv6, etc.).

The provisioning instructions may include any set of instructions suitable for defining operations of the network elements 18-22, such as but not limited to security credentials, various authorizations, conditional access controls, and the like. In addition, the provisioning instructions may specify or associate any number of other parameters with the network elements 18-22, such as but not limited to a domain name, process controls, and other parameters associated with contacting other network elements, servers (time, proxy, communication, etc.) and other elements that the network element may need to communicate with or discover in order to accomplish or otherwise achieve its desired operation. In addition, each provisioning instruction may be associated with a set of timers indicating a valid lifetime for the instruction.

The provisioning instructions May be distributed to master databases 30-32 from the controller 24, or other entity, and thereafter distributed to slave databases 34-44. The master databases 30-32 may be associated with different zones (geographies, service groups, etc.), depending on the number of network elements 18-22 anticipated to be serviced by the same. For example, a first zone may be associated with a number of network elements or geographical area of network elements, and a second zone may be associated with another number of network elements or geographical area of network elements, with each zone optionally including one master database.

The master databases 30-32 may be configured to deliver or otherwise distribute common sets of provisioning instructions to each associated slave database 34-44 such that each slave database 34-44 within the same zone may include the same set of provisioning instructions. i.e., each slave database 24-44 in the same zone may be a replica of other slave databases of the same zone. Multiple sets of provisioning instructions, such as to support different types of network elements 18-22, subscriptions, security, etc., may be stored on the slave databases, with each slave database within the same zone optionally having the same sets or groupings of provisioning instructions. This master-slave relationship allows the provisioning instructions to be easily changed by simply interacting with the master databases of the effected zones such that the Master database distributes the changes to the associated slave databases. Optionally, the slave databases 34-44 may receive and store provisioning instructions from multiple master databases 30-32, such as if the slave databases 34-44 are used to support multiple zones.

The different sets of provisioning instructions may be specified according to element identifications (Ds) associated with the network elements 18-22. For example, and without limiting the scope and contemplation of the present invention, the controller may develop and/or specify certain provisioning instructions for various network elements 18-22, or more particularly, the element IDs of the network elements 18-22. The provisioning instructions may be tabulated, computed from a formula, and/or otherwise organized or determined as a function of the element IDs or structure of the element IDs such that when provisioning instructions for a particular network element 18-22 are desired, the corresponding provisioning instructions may be located on the slave databases 34-44 as a function of the element ID of the network element 18-22 to be provisioned.

The element IDs may be unique to the network elements 18-22 and included within the network elements 18-22 at the time of manufacturing and/or otherwise associated therewith upon deployment within the network. For example, and without limiting the scope and contemplation of the present invention, the element IDs may be derived from a media access control (MAC) addresses, RFID, purchase order reference value, barcode, serial number, or some other parameter such that the element IDs provides a unique identifier for the lifetime of each network element.

Provisioning units 50-54 may be included to facilitate provisioning the network elements 18-22. The provisioning units 50-54 may be configured to interact with the slave databases 34-44 as a function of the element ID of the network element 18-22 desiring provisioning. For example, and without limiting the scope and contemplation of the present invention, certain sets of provisioning instructions associated with a set or grouping of element IDs may be distributed to a first zone with another, different set, of provisioning instructions associated with a different set or grouping of element IDs being distributed to a second zone.

The provisioning units 50-54 may be configured to contact the slave databases 34-44 within the relevant zone as a function of the element ID of the network element 18-22 to be provisioned, i.e. based on whether the element ID is associated with the first, second, or other zone. For example, if the element ID is a 10 digit number, the databases associated with first two digits may be associated with one or more of the zones such that the values of the first two digits may be used to determine the appropriate zone to contact for the corresponding provisioning instructions.

Optionally, one or more relays 56 may be included to facilitate discovery of the provisioning units 50-54 that are suitable for provisioning of the network elements 18-22. The relays 56 may be configured to intercept general provisioning requests emanating from the network elements 18-22 so as to facilitate executing provisioning operations between the requesting network elements 18-22 and the provisioning units 50-54, or otherwise discovering the provisioning units 50-54. For example, and in accordance with one non-limiting aspect of the present invention, the relays may be configured to facilitate provisioning according to methodologies and parameters specified by the Dynamic Host Configuration Protocols (DHCP) for IPv4 network elements and methodologies and parameters specified by Dynamic Host Configuration Protocols v6 (DHCPv6) for IPv6 network elements.

As noted above, multiple sets of provisioning instructions may be distributed across a number of different databases and retrievable as a function of the element IDs associated therewith. The distribution and management of the various sets or groups of provisioning instructions may be controlled or otherwise directed according to parameters, relationships, hierarchy, protocols, and other specifications of the Domain Name System (DNS) protocol.

The DNS strategies may specify time-to-live and other operations associated with the provisioning instructions, their distribution to the slave databases, and the management of the same. For example, DNS strategies may be used to automatically update the stored provisioning instructions by instigating the slave databases 34-44 to contact the master database 30-32 for updated instructions, controlling the master databases to download the same to the slave databases, and/or through some other operation. Other DNS strategies may relate to securing distribution and maintenance of the provisioning instructions and authentication of the provisioning instructions.

In this manner, the generic DNS strategies commonly used to map domain names to IP addresses, and to perform other operations related thereto, may be extended, in accordance with one non-limiting aspect of the present invention, to map element IDs to a set of provisioning instructions stored in various databases, such as by aggregating discrete pieces of provisioning information/instructions from different sources to a common master database, and thereafter to the associated slave databases, as a function of the associated element ID, and also to facilitate the recovery of the same according to the associated element ID, such as in a manner similar to recovering the IP address front the domain name.

The provisioning units 50-54 may include a DNS client and DHCP or DHCPv6 server to facilitate operations associated with the DNS protocols of the distributed databases and the DHCP or DHCPv6 protocols used for interacting with and provisioning of the network elements. A configuration agent may be included within the provisioning units to facilitate conversions and other operations associated with mapping DHCP or DHCPv6 provisioning protocols to suitable DNS protocols and vice versa such that the provisioning instructions may be retrieved from the databases according to DNS parameters and delivered to the network elements according to DHCP or DHCPv6 parameters.

In this manner, and in accordance with one non-limiting aspect of the present invention, the provisioning instructions may be distributed across a number of databases and retrieved by one or more provisioning units such that the provisioning units interface with the network elements in order to facilitate provisioning the network elements according to the parameters specified within the provisioning instructions.

Figure 2:
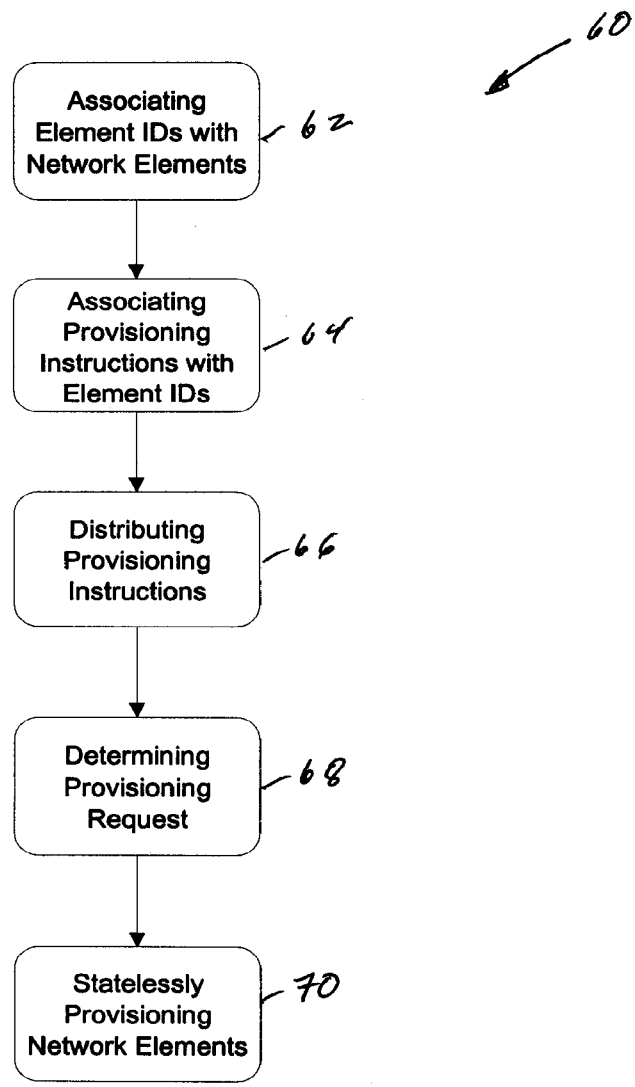
FIG. 2 illustrates a flowchart of a method of provisioning network elements in accordance with one non-limiting aspect of the present invention.

FIG. 2 illustrates a flowchart 60 of a method of provisioning network elements in accordance with one non-limiting aspect of the present invention. The method generally relates to the distribution and storage, or other management, of provisioning instructions and may be partially or wholly embodied in a computer-readable medium or other executable file/program stored or partially stored on one or more of the elements of the provisioning system.

Block 62 relates to associating element IDs with the various network elements to be provisioned in accordance with the present invention. The element IDs, as noted above, may be unique identifiers that are associated with the network elements at the time of manufacturing or thereafter such that when the network elements are connected to one of the networks, it can be identified as a function thereof.

Block 64 relates to associating provisioning instructions with the element IDs. The provisioning instructions may specify any number of operating characteristics for the network elements, as described above. Optionally, in accordance with one non-limiting aspect of the present invention, the provisioning instructions may specify one or more operating characteristics for the network elements and a unique network address that may be used to communicate with the same.

For example, and without intending to limit the scope and contemplation of the present invention, each element ID may be associated with a table entry or other entry of a relational database or other element such that each entry specifies one or more operating characteristics and the unique network address for the corresponding network element. In this manner, each network element that is to be connected to the system is allocated a provisioning instruction entry that specifies one or more operating parameters and a unique network address for the corresponding network element. If unknown network elements, i.e., those without a provisioning instruction entry, attempt provisioning, policies may be used to determine their provisioning capabilities, such as but not limited to denying provisioning, permitting limited provisioning to facilitate identifying or otherwise authorizing the element, and/or generating an alarm or message for use by service personnel to manually generate a provisioning instruction entry for the unknown network element.

Of course, other methods and logical relationships may be used to coordinate the provisioning instructions (including network addresses) with the element IDs, such as but not limited to determining the provisioning instructions from characteristics of the network connected to the network element, the provisioning unit and/or slave database used to facilitate the provisioning of the network element, as each of these elements can be used to provide indications of the provisioning instruction associated with the area, network, etc. of the network element that is to be provisioned.

Furthermore, the time-to-live values and other parameters may be associated with the provisioning instructions to facilitate the maintenance, security, and validity of the provisioning instructions over time. For example, upon expiration of the time-to-live value, the network address assigned to the corresponding provisioning instruction entry may be made available for other uses, the provisioned network element may be required to re-provision, and/or any number of other operations may be executed.

Block 66 relates to distributing the provisioning instructions for subsequent retrieval and use in provisioning the network elements. The provisioning instructions may be distributed to one or more of the master databases and thereafter replicated on the corresponding slave databases. Optionally, the provisioning instructions may be distributed according to a zonal arrangement wherein zones receive certain sets of provisioning instructions. The zonal distribution may be based on element IDs or some other parameter.

Block 68 relates to determining a provisioning request for one or more of the network elements. The provisioning request May be determined by the provisioning units as a function of signals emanating from the network element, such as but not limited to a DHCP or DHCPv6 provisioning request. The provisioning request may include the element ID of the corresponding network element and be broadcasted from an associated relay to one or more of the provisioning units, such as but not limited to an anycast communication.

Block 70 relates to statelessly provisioning the network element associated with the provisioning request. If the request is distributed through anycast communication, the anycast request may be directed to a provisioning unit assigned to service the network element such that the receiving provisioning unit may interrogate the provisioning request to obtain the element ID of the requesting network element. If the provisioning request is received according to DHCP/DHCPv6 protocols, this May require deciphering the message according to DHCP/DHCPv6 parameters in order to obtain the element ID.

Once the element ID is known, the provisioning unit may be configured to determine the zone servicing the corresponding element ID such that a secondary provisioning request may be sent from the provisioning unit to one or more of the slave databases within the corresponding zone. The query may be generated according to any number of protocols, such as but not limited the DNS resolver protocol and, optionally, possible extensions defined to the DNS record structures.

The appropriate slave database that receives the secondary provisioning request may be determined according to DNS root structures or other discovery methodologies. Therein, the corresponding provisioning entry for the specified element ID is located, and thereby, the corresponding set of provisioning instructions and unique network address. This provisioning information is then transmitted back to the requesting provisioning unit, optionally according to the protocols (in this example the DNS resolver protocol), and converted by the configuration agent to a format suitable for use in provisioning the network element, such as by converting the DNS provisioning instructions to DHCP/DHCPv6 provisioning instructions. The provisioning instructions may then be delivered to the network element to facilitate the provisioning thereof.

In this manner, the network element may be provisioned in a stateless mariner as the provisioning instructions may he automatically provided to the network element without requiring multiple provisioning units, or more particularly the DHCP/DHCPv6 severs of the provisioning units, to communicate with each other. Advantageously, because the network addresses for the to-be-provisioned network elements are pre-assigned, or dynamically assigned from a reserved set of network address, and included with the provisioning instructions, the availability of the network address need not be verified by the provisioning units communicating with other provisioning units. This is as opposed to state based provisioning that requires the provisioning units to communicate with other provisioning units in order to verify the network address availability.

Figure 3:
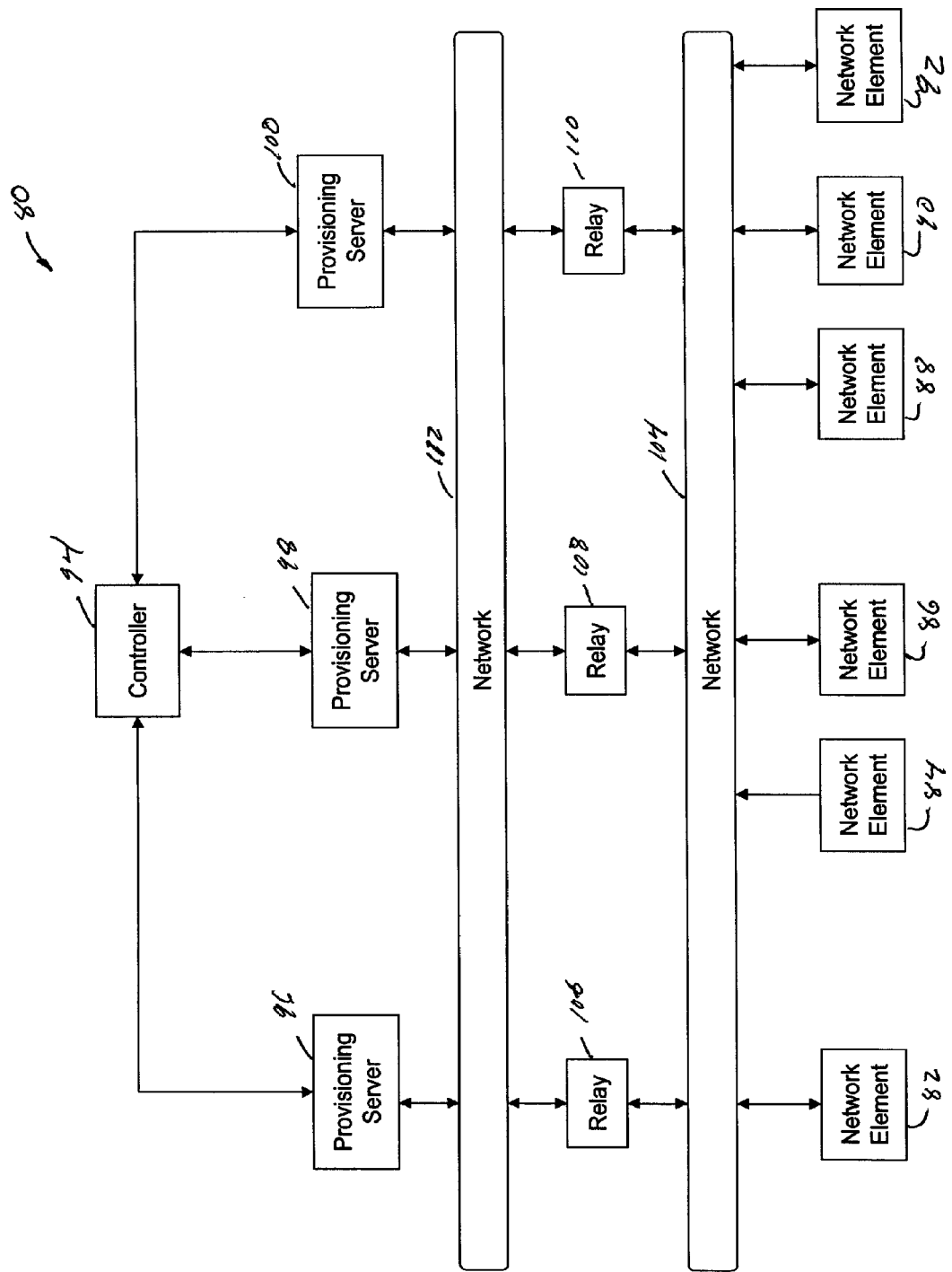
FIG. 3 illustrates a system to facilitate statelessly configuring network elements in accordance with one non-limiting aspect of the present invention.

FIG. 3 illustrates a system 80 to facilitate statelessly configuring network elements 82-92 in accordance with one non-limiting aspect of the present invention. The system includes components similar to those described above and referred to with common nomenclature such that the nature and operation thereof is similarly contemplated. The system 80 may include a controller 94 to facilitate provisioning one or more network elements 82-92. The provisioning may be facilitated with one or more provisioning servers 96-100 configured to provisioning the network elements 82-92 according to provisioning instructions received from the controller 94.

The network elements 82-92 may he provisioned to facilitate any number of operations. One non-limiting aspect of the present invention relates to the system being used to provisioning the network elements 82-92 to support subscriber access to cable television services. The present invention contemplates statelessly provisioning the network elements 82-92 to facilitate subscriber access to cable television services carried over a cable television network 104.

While FIG. 3 is described with respect to cable television systems, the present invention is not intended to be so limited and fully contemplates its application in any number of environments.

The network elements 82-92 may be any type of element having capabilities to facilitate subscriber access to services. The network elements 82-92 may be of the type distributed by media content providers as part of their services, such as but not limited to STBs, and/or commercial off the shelf elements of the type purchased at stores, such as but not limited to DVRs. The network elements 82-92 may include a unique element ID assigned at the time of manufacture or sale by a vendor, manufacturer or other entity. The element ID may be assigned prior to the corresponding network element 82-92 being available for connection to the network 104.

The controller 94 may include or be programmed with provisioning instructions for any number of network elements 82-92. The controller 94 may use the unique element IDs of the new network elements 82-92 to keep track of the related provisioning instructions. The provisioning instructions may be determined prior to the network element 82-92 connecting to the network 104. Multiple sets of provisioning instructions may be determined for each network element 82-92, such as to facilitate different connection methodologies, locations, subscriptions, etc., and multiple types of provisioning instructions may be stored on a memory or lookup table of the controller 94 to support provisioning different types of network elements 82-92.

The provisioning instructions may include instructions to facilitate provisioning the element 82-92 to support subscriber access to the services and a unique address for supporting electronic communications with the element 82-92. The assignment of the unique address for the network elements 82-92 prior to the elements 82-92 being connected to the network 104 may require supporting a vast number of unique network addresses. This may be achieved with IPv6 or other suitable addressing schemas.

The pre-assignment of the network addresses can be helpful in limiting subsequent processing and communication when the network elements 82-92 are eventually connected to the network 104. If a network element known to the controller is connected to or attempts to connect to the network 104, a unique address and/or related operating instructions for that network address is already known and available. The controller 94 need not communicate with other devices, such as the other provisioning servers 96-100, to determining if an address is available. This also allows the address to be assigned without having to track the previously assigned address as each assigned network element is unique and the likelihood of assigning the same address is at least extremely unlikely. This allows the present invention to assign and distribute network address in a stateless manner and without having to verify validity of the addresses with the other provisioning servers 96-100.

The provisioning servers 96-100 may be configured to support provisioning the network elements 82-92 according to any suitable provisioning protocol, such as but not limited to supporting DHCPv4, DHCPv6, etc., Upon receiving a provisioning request from one of the network elements 82-92, one of the provisioning servers 96-100 may contact the controller for the corresponding provisioning instructions based on an element 11) included within the provisioning query to identify the network element 82-92. The controller 94 provides the appropriate provisioning instructions to the provision server for use by the server 96-100 in provisioning the network element 82-92.

Optionally, local information associated with the location of the network element 82-92 may be included in the provisioning request and used by the controller 94 in determining the provisioning instructions. The local information may relate to a particular connection methodology of the network element 82-92, network configuration requirements for the network 10 connect to the network element 82-92., and/or any number of other pieces of information that may be specific to the location of the network element 82-92 and variable depending on the location from which the network element 82-92 is connected to the network 104. To limit processing demands on the provisioning servers 96-100, the provisioning servers 96-100 may not be required to process or otherwise know of the local provisioning requirements prior to provisioning the network elements 82-92 and instead rely upon the controller 94 to assess any local provisioning requirements.

As shown, a number of provisioning servers 96-100 may be provided to facilitate provisioning the network elements 82-92. A number of relays 106-110 may be included and configured to communicate provisioning requests from the network elements 82-92 to the provisioning servers 96-100. The provisioning servers 96-100 may be configured to execute an anycast announcement over a network 112 to announcement themselves to the relays 106-110. The relays 106-110 can use this announcement to locate the nearest provisioning servers 96-100.

The relays 106-110 may be configured to receive provisioning requests from the network elements 82-92, and in response thereto, to relay the requests to a suitable one of the provisioning servers 96-100 such that only one of the provisioning servers 96-100 responds to each of the provisioning requests to provision the requesting network elements 82-92. Optionally, the relays 106-110 may be configured to relay the provisioning requests to a nearest one of the provisioning servers 96-100 such that the provisioning server 96-100 having the shortest communication path to the requesting network element 82-92 is used for the provisioning.

The system shown in FIG. 3 is generally similar to the master-slave arrangement shown in FIGS. 1-2 but without the DNS schema used to distribute the provisioning instructions. The DNS schema may be suitable for use in the system shown in FIG. 3, such as if multiple controllers were used to server multiple provisioning servers. All aspect of the present invention, however, allow for the stateless provisioning of the network elements. This may include generating the provisioning instructions and/or assigning the network addresses prior to the network elements being connected to the network so that the same can be used in provisioning the network elements without having to communicate with the other provisioning servers or verify validity with the other provisioning servers since there is no need to determine previously allocated addresses or available addresses from the other servers.

As described above, one non-limiting aspect of the present invention may be generally characterized as a method of statelessly provisioning a network device. The method may include any number of logic operations and functions, and optionally include determining one of more provisioning instructions for the network device, associating the provisioning instructions with the device address, distributing the provisioning instructions to multiple distributed databases that are configured to store the provisioning instructions, and provisioning the network device with a provisioning unit configured for retrieving the provisioning instructions from one of the distributed databases and for provisioning the network device according to the retrieved provisioning instructions and without communicating with other provisioning servers such that the provisioning is stateless.

Optionally, the method May include associating a network address with the provisioning instructions such that the network address is provisioned to the network element in a stateless manner, retrieving the provisioning instructions from the databases according to Domain Name System (DNS) protocols, and/or distributing the provisioning instructions to the databases according to DNS protocols.

As described above, one non-limiting aspect of the present invention may be generally characterized as a method of statelessly provisioning network elements, which may include associating provisioning instructions with the network element and providing provisioning instructions to the network element for the provisioning thereof, wherein the provisioning instructions are provided in a. stateless manner.

As described above, some non-limiting aspect of the present invention be generally characterized according to the following parts:

1) Device Configuration Repositories

Those repositories that may he considered as the "source of truth" that contain all information necessary to provision devices. This may include: an IP address, a name, and other parameters such as the address of a DNS server, a TFTP server (to download config files), a XCAP server, . . . The repository may be a logical concept and in practice can be implemented as a combination of different systems, like an inventory system, an IP address management system, a billing system, . . .

2) DNS Part

The DNS may be used to combine all the data from the repositories and replicate the information in a very scalable way across an administrative domain. A special DNS zone may be set aside under the administrative domain (e.g. provisioning.comcast.com) to include all relevant data, indexed by a unique identifier for each device. Configuration parameters may be stored using classic DNS RR types, like A, AAAA or PTR or special private extensions.

Example, in the provisioning.comcast.com zone:
Device-ID IN A 10.0.0.1
Device-ID IN AAAA 2001:8db::1
Device-ID IN PRIVATE PTR device.west.comcast.com
Device-ID IN PRIVATE DNS dns1.west.comcast.com
Device-ID IN PRIVATE XCAP xcap1.west.comcast.com The exact format of the PRIVATE RR type may be defined and implemented in the same way by the repositories that update the primary zone, the DNS servers and the DHCP servers (see below) that will query (or update) it.

The Device-ID can be broken down into several components to create a hierarchical name space to simplify lookups and scaling. This hierarchy may enable very large namespace to be represented by a number of manageable size zones. If this scheme is in place, the DHCP servers (see below) must be aware of it and use the same when performing DNS lookups.

The updates to this zone are performed by (usually, but not limited to) the various device configuration repositories using Secure Dynamic DNS updates or any other mechanism supported by the DNS master server. That DNS zone may then replicated from the primary DNS server to a number of authoritative secondary slave DNS servers using traditional DNS zone update protocol, adding to the global reliability of the system. As a network traffic optimization and a reliability improvement of the system, those secondary DNS servers can be collocated with (or close to) the DHCP servers described below.

3) DHCP Part

3a) A Stateless, Highly Redundant DHCP Service

Traditionally, DHCP servers allocate IP addresses from a local pool and keep track of that allocation through DHCP leases. Such stateful or state based mechanisms prevent those servers to be replicated. One non-limiting aspect of the invention disclosed herein changes this paradigm by introducing a method to allocate statelessly IP addresses either based on a hash function of a DHCP client/element ID or sonic pre-existing data fetched in the DNS. Because this IP address allocation mechanism is stateless, DHCP servers can be replicated as many times as necessary, without any synchronization issues.

The replication mechanism may based on the DHCP relay agent that will forward DHCP queries to an anycast address representing the DHCP service instead of the unicast IP address of one DHCP server as is done traditionally. An alternate solution in IPv6 may be to use a well-known IPv6 multicast address that would represent all DHCP server in the administrative domain.

3b) DHCP Address Allocation and Other Configuration

To allocate a IP addresses and other configuration parameters, the stateless DHCP server may query the DNS client using the DHCP client-ID as the Device-ID in the zone defined above. If hierarchical Device-ID name space has been defined and used in the DNS, the DHCP server may break down the client-ID the same way before doing any lookup in the DNS.

If the DNS contains configuration information for that device, the DHCP server may fetch it and return it to the device. Lookups are done for each configuration parameter supported by the implementation of the invention. For example, the query:

? AAAA Device-ID.provisioning.comcast.com will lookup the DNS for the IPv6 address to allocate to the device.

If PRIVATE RR extensions have been defined and used in the DNS to store other configuration parameters, such extensions can be queried as well. For example, the query:

? PRIVATE XC:AP Device-ID.provisioning.comcast.com will return the xcap server to be used by the device.

If the device is unknown from the DNS, the DHCP server can create a new temporary configuration data from a template, pass it to the device and then populate back the DNS with relevant data (for example using Secure Dynamic DNS update). The decision to do this temporary allocation may be a policy one.

As required, detailed embodiments of the present invention are disclosed herein; however, it is to he understood that the disclosed embodiments are merely exemplary of the invention that may be embodied in various and alternative forms. The figures are not necessarily to scale, some elements may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
generating a network device identifier (ID) by appending a media access control address of a network device to an identifier of a geographic zone where the network device is located;
assigning the network device ID to a set of provisioning instructions comprising an internet protocol address;
receiving, by a provisioning device and from the network device, a provisioning request comprising the network device ID;
determining, by the provisioning device, the geographic zone where the network device is located based on the network device ID;
transmitting, by the provisioning device and to a database corresponding with the geographic zone, a secondary provisioning request corresponding with the geographic zone;
receiving, by the provisioning device and from the database corresponding with the geographic zone, the set of provisioning instructions; and
transmitting, by the provisioning device and to the network device, the set of provisioning instructions.

2. The method of claim 1, wherein the transmitting the set of provisioning instructions is performed without verifying an availability of the internet protocol address with any other provisioning device.

3. The method of claim 1, wherein the database corresponding with the geographic zone is one of a group of databases corresponding with the geographic zone where each database of the group of databases is a replica of other databases in the group of databases.

4. The method of claim 1, wherein the database corresponding with the geographic zone is one of a group of databases corresponding with the geographic zone where the group of databases is one of a plurality of groups of databases and each group corresponds with a different geographic zone.

5. The method of claim 1, wherein the database corresponding with the geographic zone is a slave database of a plurality of slave databases corresponding with the geographic zone, the method further comprising:
receiving, by the slave database of the plurality of slave databases corresponding with the geographic zone and from a master database associated with the plurality of slave databases and corresponding with the geographic zone, the set of provisioning instructions;
receiving, by the slave database, the secondary provisioning request;
determining, by the slave database, the set of provisioning instructions based on the network device ID; and
transmitting, by the slave database and to the provisioning device, the set of provisioning instructions.

6. The method of claim 1, further comprising:
identifying the provisioning device, from a plurality of provisioning devices, as a provisioning device nearest to the network device.

7. The method of claim 1, further comprising:
enabling the provisioning device to provision the network device without having to communicate with other provisioning devices.

8. The method of claim 1, wherein the assigning occurs prior to the receiving the provisioning request.

9. A method comprising:
assigning a set of provisioning instructions, comprising an internet protocol address, to a network device identifier (ID) of a network device;
receiving, by a provisioning device and from the network device, a provisioning request comprising the network device ID of the network device;
determining, by the provisioning device and based on the network device ID, a geographic zone where the network device is located;
determining, from a plurality of databases, a database that corresponds with the geographic zone; and
in response to transmitting a query comprising the network device ID to the database that corresponds with the geographic zone where the network device is located, receiving, by the provisioning device and from the database that corresponds with the geographic zone, the set of provisioning instructions.

10. The method of claim 9, further comprising:
enabling the provisioning device to provision the network device without having to communicate with other provisioning devices.

11. The method of claim 9, further comprising:
identifying the provisioning device, from a plurality of provisioning devices, as a provisioning device nearest to the network device.

12. The method of claim 9, further comprising:
generating the network device ID by appending a media access control address of the network device to an identifier of the geographic zone where the network device is located.

13. The method of claim 9, wherein the database that corresponds to the geographic zone is one database of a group of databases that correspond to the geographic zone where each database is a replica of other databases of the group of databases.

14. The method of claim 9, wherein the database that corresponds to the geographic zone is one database in of a group of databases that correspond to the geographic zone, wherein the group of databases is one a plurality of groups of databases and each group corresponds with a different geographic zone.

15. The method of claim 9, wherein the database that corresponds to the geographic zone is a slave database of a plurality of slave databases corresponding with the geographic zone, the method further comprising:
receiving, by the slave database and from a master database associated with the plurality of slave databases and corresponding with the geographic zone, the set of provisioning instructions;
receiving, by the slave database, the query;
determining, by the slave database, the set of provisioning instructions based on the network device ID; and
transmitting, by the slave database and to the provisioning device, the set of provisioning instructions.

16. The method of claim 9, wherein the assigning occurs prior to the receiving the provisioning request.

17. A method comprising:
assigning, by a computing device associated with a master database, a set of provisioning instructions to a network device identifier (ID) of a network device, wherein the set of provisioning instructions comprises an internet protocol address, the master database corresponding to a geographic zone of a plurality of geographic zones, the network device ID comprising an identifier uniquely associated with the network device and a geographic identifier of the geographic zone where the network device is located;
transmitting, from the computing device associated with the master database and to each of a plurality of computing device respectively associated with a plurality of slave databases corresponding to the geographic zone of the plurality of geographic zones, the set of provisioning instructions, wherein each slave database corresponding to the geographic zone is a replica of other slave databases corresponding to the geographic zone;

receiving, by a computing device associated with a slave database of the plurality of slave databases and from a provisioning device, a query comprising the network device ID;

determining, by the computing device associated with the slave database of the plurality of slave databases, the set of provisioning instructions for the network device based on the network device ID of the network device; and transmitting, by the computing device associated with the slave database of the plurality of slave databases and to the provisioning device, the set of provisioning instructions for the network device.

18. The method of claim 17, further comprising:
receiving, by the provisioning device, the set of provisioning instructions for the network device; and
transmitting, by the provisioning device and to the network device, the set of provisioning instructions without verifying an availability of the interne protocol address with any other provisioning device from a plurality of provisioning devices.

19. The method of claim 17, further comprising:
determining, by the provisioning device, the geographic zone, of the plurality of geographic zones, where the network device is located based on the geographic identifier of the geographic zone where the network device is located; and
transmitting, from the provisioning device and to the computing device associated with the slave database corresponding to the geographic zone, the query.

20. The method of claim 17, wherein the assigning occurs prior to receiving a provisioning request from the network device.

\* \* \* \* \*

UNITED STATES PATENT AND TRADEMARK OFFICE
CERTIFICATE OF CORRECTION

| | |
|---|---|
| PATENT NO. | : 9,602,342 B2 |
| APPLICATION NO. | : 14/072183 |
| DATED | : March 21, 2017 |
| INVENTOR(S) | : Durand et al. |

It is certified that error appears in the above-identified patent and that said Letters Patent is hereby corrected as shown below:

In the Specification

Column 1, Detailed Description of the Preferred Embodiment(s), Line 57:
After "DETAILED", delete "ED" therefor Column 2, Detailed Description of the Preferred Embodiment(s), Line 8:
Delete "media," and insert --media-- therefor Column 2, Detailed Description of the Preferred Embodiment(s), Line 25:
Delete "invention;" and insert --invention,-- therefor Column 2, Detailed Description of the Preferred Embodiment(s), Line 31-32:
Delete "programming," and insert --programming-- therefor Column 2, Detailed Description of the Preferred Embodiment(s), Line 55:
Delete "Media" and insert --media-- therefor Column 2, Detailed Description of the Preferred Embodiment(s), Line 62:
Delete "arty" and insert --any-- therefor Column 3, Detailed Description of the Preferred Embodiment(s), Line 11:
Delete "settop box" and insert --set-top box-- therefor Column 3, Detailed Description of the Preferred Embodiment(s), Line 55:
Delete "non--subscriber" and insert --non-subscriber-- therefor Column 4, Detailed Description of the Preferred Embodiment(s), Line 39:
Delete "May" and insert --may-- therefor Signed and Sealed this
Fifth Day of March, 2024

*Katherine Kelly Vidal*
Katherine Kelly Vidal
*Director of the United States Patent and Trademark Office*

CERTIFICATE OF CORRECTION (continued)
U.S. Pat. No. 9,602,342 B2

Column 4, Detailed Description of the Preferred Embodiment(s), Line 55:
Delete "instructions." and insert --instructions,-- therefor Column 4, Detailed Description of the Preferred Embodiment(s), Line 56:
Delete "24-44" and insert --34-44-- therefor Column 4, Detailed Description of the Preferred Embodiment(s), Line 65:
Delete "Master" and insert --master-- therefor Column 5, Detailed Description of the Preferred Embodiment(s), Line 3:
Delete "he" and insert --be-- therefor Column 5, Detailed Description of the Preferred Embodiment(s), Line 4:
Delete "(Ds)" and insert --(IDs)-- therefor Column 6, Detailed Description of the Preferred Embodiment(s), Line 29:
Delete "front" and insert --from-- therefor Column 7, Detailed Description of the Preferred Embodiment(s), Line 57:
Delete "May" and insert --may-- therefor Column 8, Detailed Description of the Preferred Embodiment(s), Line 6:
Delete "May" and insert --may-- therefor Column 8, Detailed Description of the Preferred Embodiment(s), Line 34:
Delete "mariner" and insert --manner-- therefor Column 8, Detailed Description of the Preferred Embodiment(s), Line 39:
Delete "to-be-provisioned" and insert --to be provisioned-- therefor Column 8, Detailed Description of the Preferred Embodiment(s), Line 60:
Delete "he" and insert --be-- therefor Column 9, Detailed Description of the Preferred Embodiment(s), Line 59:
Delete "etc.," and insert --etc.-- therefor Column 9, Detailed Description of the Preferred Embodiment(s), Line 63:
Delete "11)" and insert --ID-- therefor Column 10, Detailed Description of the Preferred Embodiment(s), Line 7:
Delete "10" and insert --104-- therefor Column 10, Detailed Description of the Preferred Embodiment(s), Line 7:
Delete "82-92.," and insert --82-92,-- therefor

CERTIFICATE OF CORRECTION (continued)
U.S. Pat. No. 9,602,342 B2

Column 11, Detailed Description of the Preferred Embodiment(s), Line 4:
Delete "May" and insert --may-- therefor Column 11, Detailed Description of the Preferred Embodiment(s), Line 17:
Delete "a." and insert --a-- therefor Column 11, Detailed Description of the Preferred Embodiment(s), Line 22:
Delete "he" and insert --be-- therefor Column 12, Detailed Description of the Preferred Embodiment(s), Line 10:
Delete "sonic" and insert --some-- therefor Column 12, Detailed Description of the Preferred Embodiment(s), Line 42:
Delete "XC:AP" and insert --XCAP-- therefor Column 12, Detailed Description of the Preferred Embodiment(s), Line 51:
Delete "he" and insert --be-- therefor In the Claims Column 14, Claim 14, Line 34:
Before "of", delete "in" therefor Column 16, Claim 18, Line 6:
Delete "interne" and insert --internet-- therefor